United States Patent
Hunt et al.

(10) Patent No.: US 6,223,215 B1
(45) Date of Patent: Apr. 24, 2001

(54) TRACKING A USER'S PURCHASES ON THE INTERNET BY ASSOCIATING THE USER WITH AN INBOUND SOURCE AND A SESSION IDENTIFIER

(75) Inventors: Simon R. Hunt, Campbell; Steven P. Wisner, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/158,327

(22) Filed: Sep. 22, 1998

(51) Int. Cl.[7] .................................................. G06F 15/16

(52) U.S. Cl. ..................... 709/217; 709/203; 709/218; 709/224; 709/245; 707/501

(58) Field of Search ................................ 705/10, 26, 27, 705/1, 56; 709/218, 217, 203, 224, 245

(56) References Cited

U.S. PATENT DOCUMENTS

| | | | |
|---|---|---|---|
| 5,715,314 | * 2/1998 | Payne et al. | 705/26 |
| 5,724,424 | * 3/1998 | Gifford | 705/26 |
| 5,819,285 | * 10/1998 | Damico et al. | 707/104 |
| 5,983,199 | * 11/1999 | Kaneko | 705/26 |
| 5,991,740 | * 11/1999 | Messer | 705/27 |
| 6,029,141 | * 2/2000 | Bezos et al. | 705/27 |

FOREIGN PATENT DOCUMENTS 9-001066 * 1/1997 (JP) ................................ G06F/15/16

OTHER PUBLICATIONS

Unknown. NetSales' Cyberstore Program Creates New Revenues for High Traffic Web Sites. PR, Newswire, Aug. 1997.*

AppNet: What AdMaximize is. http://www.admaximize.com/admax_is.html. Printed on Dec. 2, 1999.*

WebConnect: What We Do. http://www.webconnect.net/newmedia/WhatWeDo.asp. Printed on Dec. 2, 1999.*

Tracking to the Max (i33 Communications Launched AdMaximize System to measure Erffectiviness of Online Advertising) Promo. vol. XI, No. 6, p. 158, May 1998.* i33 Communications Releases new Version 1.0 of Leading AdMaximize ROI Service. Business Wire, Oct. 1998.*

WebConnect—Advertisers Can Now Track Their Web Advertising from Impresion, to Click, to Sale on Every Site on the Internet. Business Wire, Jul. 30, 1998.*

New Ad Tracking From i33 Launched. dot.COM, vol. 5, No. 1, Apr. 1998.*

Santo, Brian. Companies Tailor Web Sites to Customers' Needs. Electronic Engineering Times, No. 919, p. 152, Sep. 16, 1996.*

Advertiser Can Track Ad Effectiveness. dot.COM, vol. 1, No. 5, Aug. 1, 1998.*

Markets still leery of Web Ads. Business Marketing, vol. 82, No. 2, p. M1, Mar. 1997.*

Hyperlinks Make Money—Amazon Pays Sites for Successful Sales. InformationWeek, p. 54, Dec. 1996.*

(List continued on next page.)

*Primary Examiner*—Vincent Millin
*Assistant Examiner*—Cuong H. Nguyen
(74) *Attorney, Agent, or Firm*—Richard H. Butt; Harold T. Fujii

(57) ABSTRACT

In one embodiment, a method for interactive network session tracking from inbound source to net sale includes storing a unique session ID (identifier) in an entry in a session database, and associating the session ID with an inbound source (origin) of the user of an interactive network site. The user's actions, such as page views, product detail views, and shopping cart additions and deletions, can also be stored in the session database associated with the session ID. The unique session ID is embedded in a digital offer that is stored in a transaction database such that net sale data is associated with the session ID. Reporting and correlation of transaction data and the user activity data can be performed offline for analysis of purchase and traffic patterns.

25 Claims, 6 Drawing Sheets

OTHER PUBLICATIONS

Wexler, Diane. Amazon.com pays fees for book–buying referrals. Publishers Weekly, vol. 243, No. 35, p. 29, Aug. 26, 1996.*

Harper, Christian. Amazon.com Introduces "Amazon.com Associates" Business Wire, Jul 18, 1996.*

Increasing Effectiveness. http://www.doubleclick.net/advertisers/network/increasing.htm. Printed on Dec. 1, 1999.*

Adforce Debuts Online Tracking Technology to Measure Ad Campaign ROI. Press Release http://www.adforce.com/home/press100799.html, Aug. 7, 1999.* i33 Communications Launches AdMaximize Customizable Internet–Based Service Measures and Optimizes Banner Ad Perfromance Against Click Throughs. Business Wire, Mar. 10, 1998.*

SecureLink SDK (Programmers's Tutorial, p/n 42–11230–A01).

Open Market: Technical White Paper Security Considerations in Open Market's Products (Dec. 13, 1996).

SecureLink™ $SKD_{3.0}$/ Programmer's Tutorial (p/n 42–11230–A01).

Open Market Technical White Paper: Security Considerations in Open Market's Products (Dec. 13, 1996).

* cited by examiner

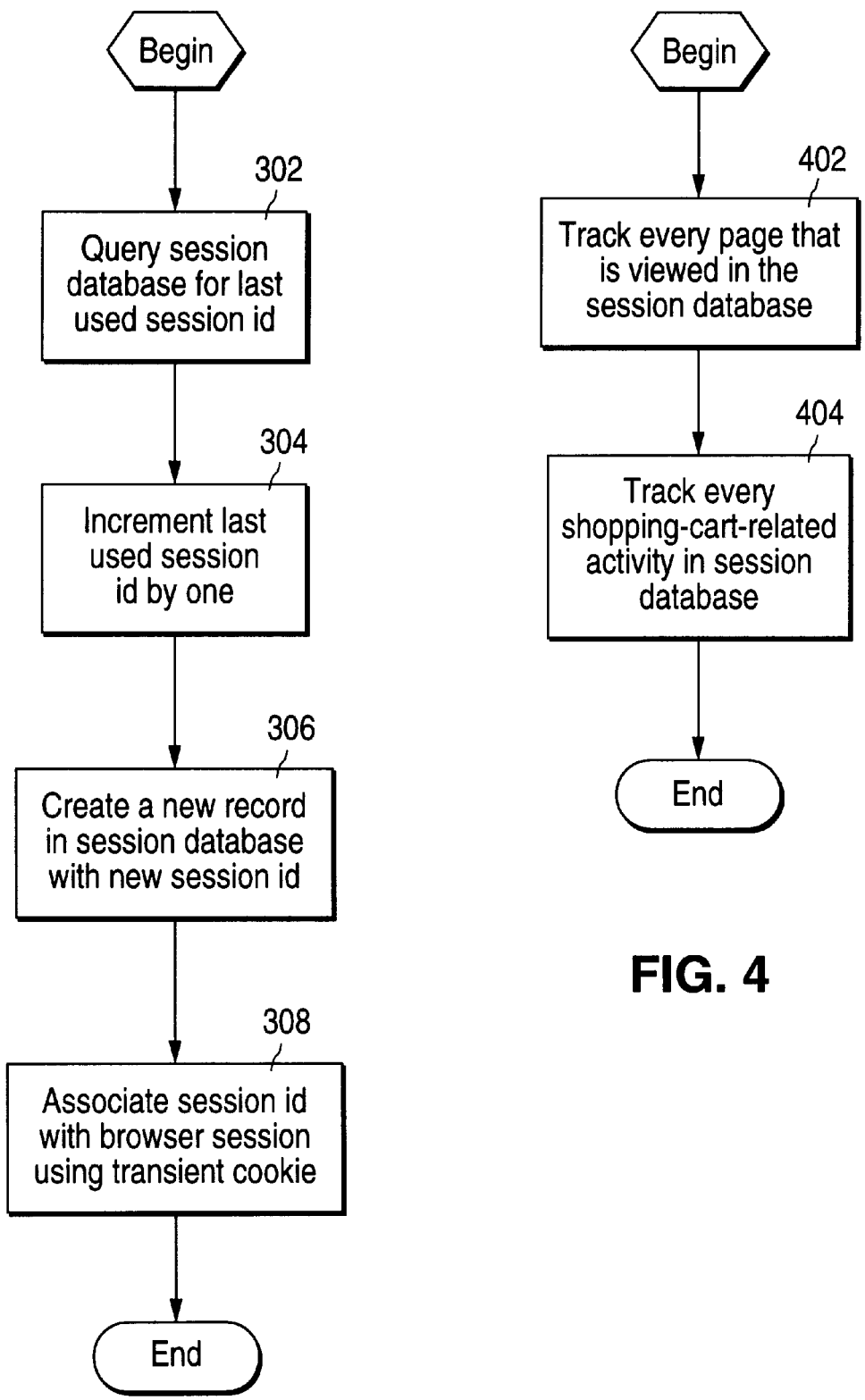

TRACKING A USER'S PURCHASES ON THE INTERNET BY ASSOCIATING THE USER WITH AN INBOUND SOURCE AND A SESSION IDENTIFIER

FIELD OF THE INVENTION

The present invention relates generally to electronic commerce and, in particular, to interactive network session tracking from inbound source to net sale.

BACKGROUND OF THE INVENTION

The World Wide Web (WWW) has become an increasingly popular entertainment and information medium for consumers. The popularity of the WWW has led to the commercialization of this new medium. As a result, the WWW has become a significant new medium for commerce, which is referred to as electronic commerce or E-commerce. Vendors offer goods and services for sale via various WWW sites. For example, a vendor may sell computers, entertainment media, or computer software over the WWW via an online store. Security mechanisms, such as the well-known Secure Sockets Layer (SSL) protocol standard have been developed to provide secure electronic transactions of sensitive data (e.g., encryption of financial data) over the Internet.

Advertising on the WWW represents another strategy for generating revenue through the popularity of the WWW. For example, a WWW site can sell advertising space on its frequently visited home page (e.g., www.yahoo.com). Statistics on the number of hits on any given static HTML page of the WWW site can be maintained to determine the popularity of the WWW page.

SUMMARY OF THE INVENTION

As the revenue generated from E-commerce and advertising on interactive networks, such as the WWW, continues to increase, interactive network session tracking of origin-through-sales series of actions is needed. For example, an origin-through-sales series of actions includes a customer's (e.g., a WWW user of an online store) origin, such as a unique source ID (identifier) of a banner (advertisement) on a search engine WWW site (e.g., using standard name-value pairs passed via HTTP protocol). The origin-through-sales series of actions can also include the customer's browsing path through an interactive network site, such as a WWW online store site, and optionally the amount of time spent by the customer at the network site. The origin-through-sales series of actions further includes the customer's net sales information, such as goods or services purchased through the online store.

Tracking the origin-through-sales series of actions is referred to as session tracking from inbound source to net sale. Session tracking from inbound source to net sale advantageously associates a user's inbound source data with actual net sales data. For example, the session tracking data gathered can be analyzed offline and used to measure the effectiveness of media (advertisement) placements to maximize allocation of media budget resources.

In a traditional WWW site using static HTML (HyperText Markup Language) pages, session tracking can be performed through analysis of WWW server logs using commercially available tools. However, the commercially available tools cannot perform session tracking in a dynamically generated WWW site in which the contents of the site exist as sets of data in a database rather than as static HTML pages, such as an online store that maintains an online catalog in a database. Moreover, the commercially available tools cannot perform session tracking in a WWW site that provides a (secure) purchase subsystem (e.g., using SSL protocol instead of HTTP protocol), because the desired information is encrypted.

Accordingly, the present invention provides interactive network session tracking from inbound source to net sale. In one embodiment, a method includes storing a unique session ID in an entry in a session tracking database, and associating the session ID with a user's browser, such as via a transient HTTP (HyperText Transfer Protocol) cookie. The user's origin, such as a unique source ID of a banner (advertisement) on a search engine WWW site (e.g., using standard name-value pairs passed via HTTP protocol), is stored in the session database associated with the session ID. The user's actions, such as page views, product detail views, and additions and deletions of items in a virtual shopping cart, can also be stored in the cession database associated with the session ID. Further, the session ID is embedded in a field of a transaction database of a (secure) purchase subsystem. For example, the purchase subsystem can be implemented using the commercially available Open Market TRANSACT database. The Open Market TRANSACT database maintains the net sales data associated with the session ID. Thus, the net sales data can subsequently be extracted using the session ID as a key. Reporting and correlation of user action data stored in the session database and net sales data stored in the transaction database can be performed offline to analyze sale transaction patterns and traffic patterns.

A "seam" between the catalog (presentation) subsystem and the purchase subsystem represents another problem with secure transactions over interactive networks, such as the WWW. For example, the catalog subsystem includes a shopping cart database that maintains the session ID, all items added in the shopping cart associated with the session ID, and in-stock status for each added item (e.g., back-ordered items can be determined using the value of the in-stock status). If the user decides to purchase the items in the shopping cart, the shopping cart data is passed to the purchase subsystem. However, if the user subsequently decides to return to the catalog subsystem, the shopping cart data stored in the shopping cart database of the catalog subsystem may not be consistent (may be out of sync) with the shopping cart data of the transaction database. For example, the user may have deleted items from the shopping cart while interacting with the purchase subsystem.

Accordingly, in one embodiment, the seam between the catalog subsystem and the purchase subsystem is eliminated. The shopping cart database of the catalog subsystem is updated to reflect any shopping cart modifications performed by the user while interacting with the purchase subsystem. As a result, the shopping carts of the purchase subsystem and the catalog subsystem are effectively synchronized. Thus, if a user returns to the catalog subsystem from the purchase subsystem, the shopping cart database provides the appropriate shopping cart data associated with the user's unique session ID.

Other aspects and advantages of the present invention will become apparent from the following detailed description and accompanying drawings.

BRIEF DESCRIPTION OF THE DRAWINGS

FIG. 3 is a flow diagram of stage 202 of FIG. 2 shown in greater detail in accordance with one embodiment of the present invention.

FIG. 4 is a flow diagram of stage 206 of FIG. 2 shown in greater detail in accordance with one embodiment of the present invention.

DETAILED DESCRIPTION OF THE INVENTION

Figure 1:
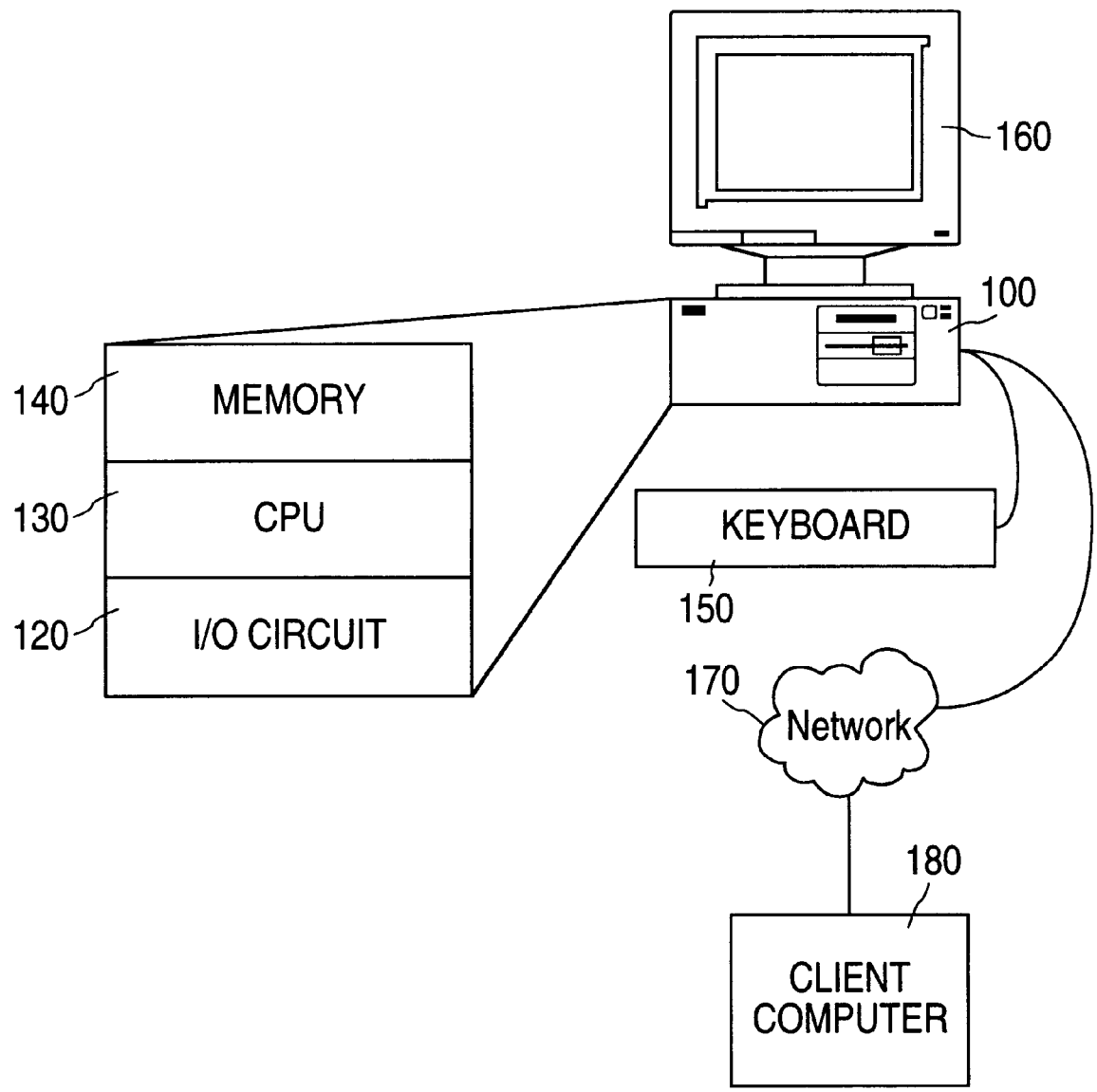
FIG. 1 is a block diagram of a data processing system in accordance with one embodiment of the present invention.

FIG. 1 illustrates a data processing system in accordance with one embodiment of the present invention. FIG. 1 shows a computer 100, which includes three major elements. Computer 100 includes an input/output (I/O) circuit 120, which is used to communicate information in appropriately structured form to and from other portions of computer 100 and other devices or networks external to computer 100. Computer 100 includes a central processing unit (CPU) 130 (e.g., a microprocessor) in communication with I/O circuit 120 and a memory 140 (e.g., volatile and nonvolatile memory). These elements are those typically found in most general purpose computers and, in fact, computer 100 is intended to be representative of a broad category of data processing devices.

A raster display monitor 160 is shown in communication with I/O circuit 120 and issued to display images generated by CPU 130. Any well-known variety of cathode ray tube (CRT) or other type of display can be used as display 160. A conventional keyboard 150 is also shown in communication with I/O circuit 120.

It will be appreciated by one of ordinary skill in the art that computer 100 can be part of a larger system. For example, computer 100 can be a server computer that is in data communication with other computers. As illustrated in FIG. 1, computer 100 is in data communication with a client computer 180 via a network 170, such as a local area network (LAN) or the Internet.

In particular, computer 100 can include session tracking circuitry for performing session tracking from inbound source to net sale in accordance with the teachings of the present invention. In one embodiment, as will be appreciated by one of ordinary skill in the art, the present invention can be implemented in software executed by computer 100, which is a server computer in data communication with client computer 180 via network 170 (e.g., the software can be stored in memory 140 and executed on CPU 130), as further discussed below.

Figure 2:
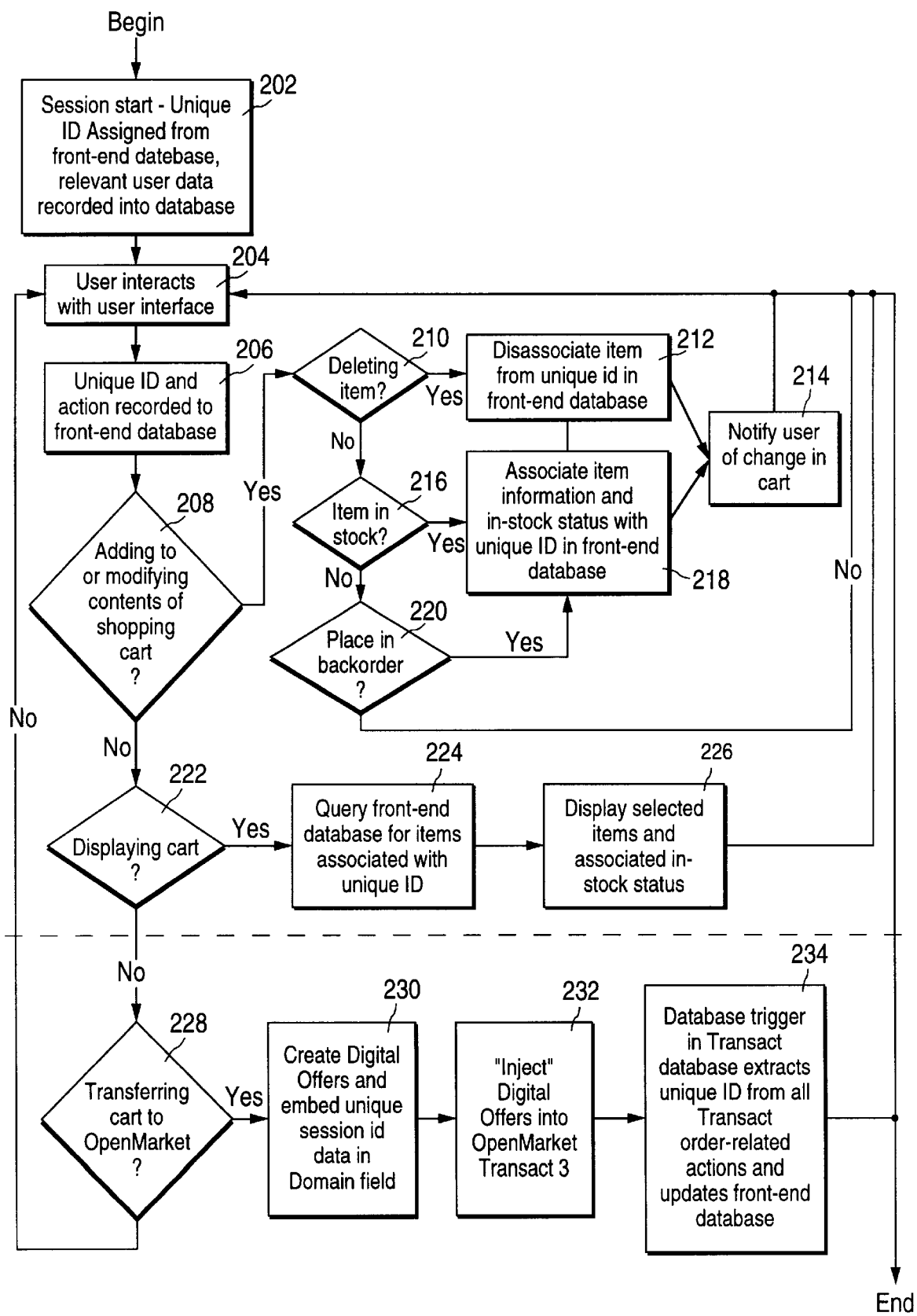
FIG. 2 is a flow diagram of interactive network session tracking from inbound source to net sale in accordance with one embodiment of the present invention.

FIG. 2 is a flow diagram of interactive network session tracking from inbound source to net sale in accordance with one embodiment of the present invention. Operation begins at stage 202 in response to a new user initiating access to an interactive network site. At stage 202, a unique session ID (identifier) is assigned from a front-end session database, and relevant user data is recorded in the session database associated with the session ID. For example, the relevant user data includes the user's inbound source (origin), such as a unique source ID of a banner (advertisement) on a search engine WWW site (e.g., which can be determined using standard name-value pairs passed via HTTP protocol). Stage 202 is discussed in further detail below with respect to FIG. 3.

At stage 204, the user interacts with the user interface of the network site. For example, the user interacts with the WWW online store site by adding or deleting items from a virtual shopping cart or by jumping to different, dynamically generated HTML pages of the WWW site. At stage 206, any action performed by the user during stage 204 is recorded in the session database and associated with the session ID. Stage 206 is discussed in further detail below with respect to FIG. 4.

At stage 208, whether the user added or modified items in the shopping cart during stage 206 is determined. If so, operation proceeds to stage 210. Otherwise, operation proceeds to stage 222. At stage 210, whether an item is to be deleted from the shopping cart is determined. If so, operation proceeds to stage 212. Otherwise, operation proceeds to stage 216. At stage 212, the deleted item is disassociated from the session ID in a front-end shopping cart database. Operation then proceeds to stage 214, which is discussed below. At stage 216, whether the item to be added is in stock is determined. If so, operation proceeds to stage 218. Otherwise, operation proceeds to stage 220. At stage 218, the added item is associated with the session ID in the shopping cart database. The in-stock status is also associated with the session ID in the shopping cart database. At stage 220, the out-of-stock item is placed on backorder. The entry in the shopping cart database that is associated with the session ID is then appropriately updated at stage 218. At stage 214, the user is notified of the change in the shopping cart. For example, the user is appropriately notified of the added or modified item(s) in the shopping cart. Stages 212 and 218 are further discussed below with respect to FIG. 5.

At stage 222, whether the user desires to have the contents of the user's shopping cart displayed is determined. For example, the user may want to view the currently added items in the user's shopping cart. If so, operation proceeds to stage 224. Otherwise, operation proceeds to stage 228. At stage 224, the shopping cart database is queried for items associated with the user's session ID. Stage 224 is further discussed below with respect to FIG. 6. At stage 226, the selected items and associated in-stock status are displayed to the user. For example, the user's selected items for purchase are output to the user's display.

At stage 228, whether the user is ready to purchase the currently selected items is determined. If so, operation proceeds to stage 230 and transitions to a (secure) purchase subsystem (e.g., a purchase subsystem that communicates via the Internet using an encrypted protocol to protect sensitive financial data). Otherwise, operation returns to stage 204. In particular, as shown by the horizontal dashed line of FIG. 2, if the user elects to proceed to purchases of the selected items in the user's shopping cart, then operation transitions across a seam between a first subsystem and a second subsystem of the network site (e.g., a WWW server). In one embodiment, the first subsystem is a catalog subsystem, which uses standard HTTP protocol, and the second subsystem is a secure purchase subsystem, which uses standard SSL (Secure Sockets Layer) protocol (i.e., an encrypted protocol for security purposes). The architecture of a system for implementing the teachings of the present invention is further described below with respect to FIG. 10.

At stage 230, a digital offer is created to execute a net sale transaction (e.g., a customer order) of the selected items. For example, the shopping cart data stored in the shopping cart database can be passed to Open Market's commercially available TRANSACT software for creation of one or more digital offers (e.g., one digital offer per product). The session ID is embedded in the Domain field (also called the unique ID field) of each digital offer such that inbound source, user activity at the network site, and net sales data are all associated with the same unique session ID for subsequent (e.g., offline) correlation and analysis. Stage 230 is further discussed below with respect to FIG. 7.

At stage 232, the digital offer is injected into a transaction database, such as the commercially available Open Market TRANSACT database. Thus, the user's shopping cart data is also maintained in the transaction database of the purchase subsystem and is associated with the user's unique session ID. Stage 232 is further discussed below with respect to FIG. 8.

The user can modify items in the user's shopping cart after entering into the purchase subsystem. For example, the user may decide to delete an item from the user's shopping cart. Accordingly, at stage 234, the shopping cart data associated with the session ID that is stored in the Open Market TRANSACT database is extracted from all TRANSACT order-related actions and the shopping cart database is appropriately updated. Accordingly, the shopping cart database of the catalog subsystem is synchronized with the shopping cart data stored in the transaction database of the purchase subsystem. Stage 234 is further discussed below with respect to FIG. 9. If the user executes any further interactions with the user interface of the WWW online store site, then operation returns to stage 204. Otherwise, (i.e., the user exits the browser session) operation terminates.

FIG. 3 is a flow diagram of stage 202 of FIG. 2 shown in greater detail in accordance with one embodiment of the present invention. At stage 302, the session database is queried for the last used session ID. At stage 304, the last used session ID is incremented by, for example, an integer value of one. At stage 306, a new entry, such as a new record, in the session database is created with a new session ID. For example, the new record includes the new session ID, a source ID (i.e., an inbound source), a time stamp, a referrer URL (Universal Resource Locator), an IP (Internet Protocol) address, and an entry point (e.g., WWW online store site start page). At stage 308, the session ID is associated with the user's browser session using a standard transient (HTTP) cookie (i.e., the cookie stored on the user's computer includes the session ID). Thus, the user's subsequent actions (e.g., HTTP requests) are associated with the user's unique session ID at least until the user exits the user's browser (i.e., the user's session is viewed as the life of the user's browser session).

FIG. 4 is a flow diagram of stage 206 of FIG. 2 shown in greater detail in accordance with one embodiment of the present invention. At stage 402, every WWW page (e.g., HTML page) that is viewed is tracked in the session database and associated with the session ID. At stage 404, every shopping-cart-related activity is tracked in the session database and associated with the session ID. In particular, the session database records include the following: the session ID, the time stamp, the page viewed or nature of interaction, and (for shopping-cart-related activities) the online store products or services added or modified.

Figure 5:
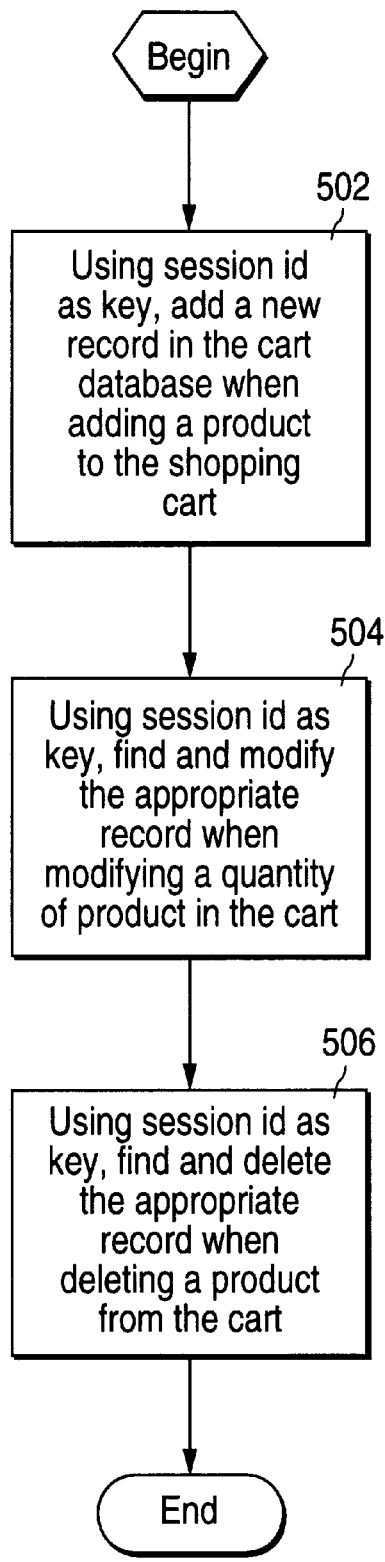
FIG. 5 is a flow diagram of stages 212 and 218 of FIG. 2 shown in greater detail in accordance with one embodiment of the present invention.

FIG. 5 is a flow diagram of stages 212 and 218 of FIG. 2 shown in greater detail in accordance with one embodiment of the present invention. At stage 502, when adding a product to the shopping cart, a new record is added in the shopping cart database. For example, the new record includes the session ID, a model identifier, an in-stock indicator (e.g., Y or N for in stock or out-of-stock, respectively, which can then be interpreted to determine if an added item is on back-order), and a quantity. At stage 504, when modifying the quantity of an item already in the shopping cart, the record in the shopping cart database containing the item is located using the session ID, model, and in-stock indicator as criteria. The appropriate criteria can then be updated. An adjusted quantity can trigger a change to an out-of-stock indicator if the quantity exceeds available inventory. At stage 506, when deleting a product from the shopping cart, the appropriate record is located as similarly discussed above. The located record can then be deleted.

Figure 6:
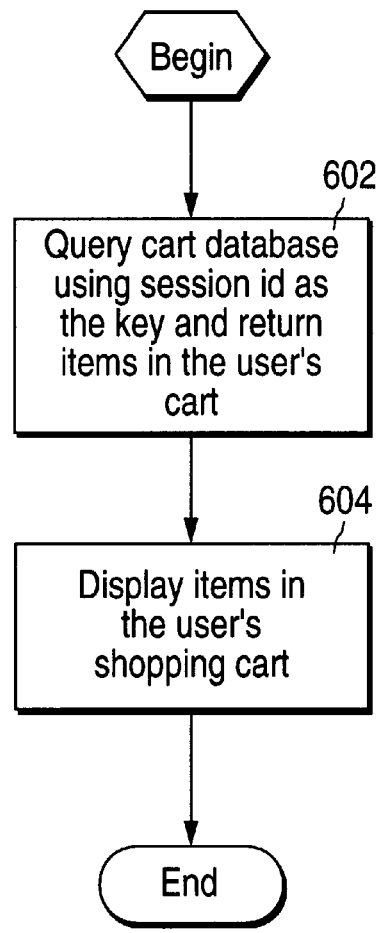
FIG. 6 is a flow diagram of stage 224 of FIG. 2 shown in greater detail in accordance with one embodiment of the present invention.

FIG. 6 is a flow diagram of stage 224 of FIG. 2 shown in greater detail in accordance with one embodiment of the present invention. At stage 602, a query of the shopping cart database is executed using the session ID as the key to return items in the user's shopping cart. At stage 604, the items in the user's shopping cart are displayed. The display and ordering of the items in the user's shopping cart can be managed by a user interface component external to the shopping cart implementation.

Figure 7:
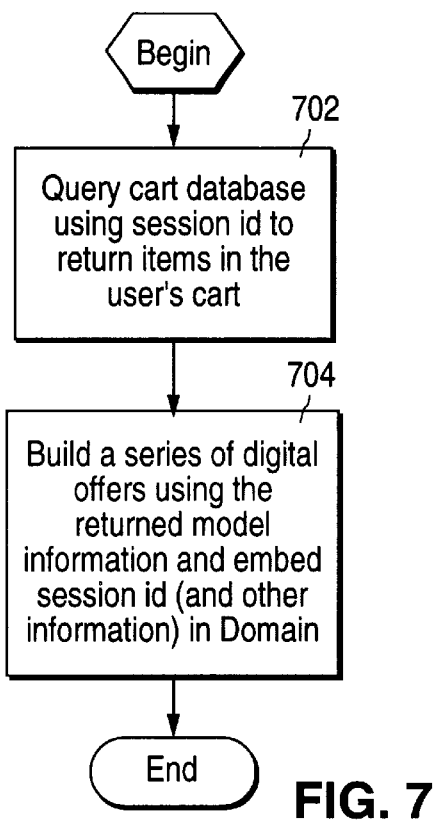
FIG. 7 is a flow diagram of stage 230 of FIG. 2 shown in greater detail in accordance with one embodiment of the present invention.

FIG. 7 is a flow diagram of stage 230 of FIG. 2 shown in greater detail in accordance with one embodiment of the present invention. At stage 702, a query of the shopping cart database is executed using the session ID and optionally the in-stock indicator as the keys to return items in the user's shopping cart. At stage 704, using the returned model identifier information, a series of digital offers is built in the standard Open Market TRANSACT 3 format. For example, the specification of the Open Market TRANSACT API (Application Program Interface) includes a field called the Unique ID field, which is also referred to as the Domain field. The session ID is embedded in the Domain field, which allows cross-application interaction and, in particular, allows for online or offline correlation of user action data across the seam between the catalog subsystem and the purchase subsystem. For example, the association of the digital offer data with the unique session ID will allow a separately developed reporting tool to correlate details of a sale with the inbound source, user action at the network site, and net sale data. The Domain field can also contain other application-specific information.

Figure 8:
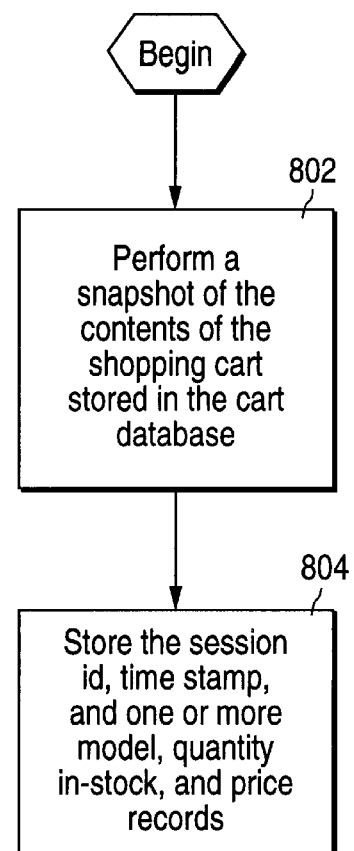
FIG. 8 is a flow diagram of stage 232 of FIG. 2 shown in greater detail in accordance with one embodiment of the present invention.

FIG. 8 is a flow diagram of stage 232 of FIG. 2 shown in greater detail in accordance with one embodiment of the present invention. At stage 802, a snapshot of the shopping cart's contents (as stored in the shopping cart database of the catalog subsystem) is performed. In particular, a snapshot is taken of each of the following: the session ID, the time stamp, and the one or more model identifiers, quantity, in-stock indicator, and price records. At stage 804, the snapshot of data is then stored in the session database. At stage 806, the shopping cart contents (i.e., the digital offers created at stage 230) are injected into the Open Market TRANSACT database.

Figure 9:
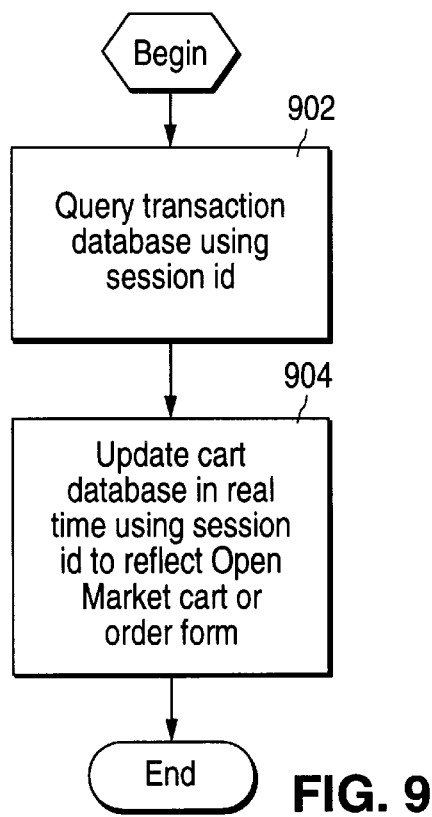
FIG. 9 is a flow diagram of stage 234 of FIG. 2 shown in greater detail in accordance with one embodiment of the present invention.

FIG. 9 is a flow diagram of stage 234 of FIG. 2 shown in greater detail in accordance with one embodiment of the present invention. At stage 902, the session ID, which is embedded in the Domain field, is used as the primary key to shopping cart data stored in the Open Market TRANSACT database. At stage 904, the front-end shopping cart database is modified (updated) to accurately reflect the contents as portrayed in the Open Market shopping cart or order form as stored in the Open Market TRANSACT database. In one embodiment, an Oracle database trigger updating the front-end shopping cart database is implemented to react to changes made in real time to the Open Market TRANSACT database. In another embodiment, real-time monitoring of the user's interactions with Open Market TRANSACT is provided using a customized function implemented using the Open Market TRANSACT screen customization. Accordingly, the front-end shopping cart database is synchronized with the Open Market TRANSACT database. Moreover, a user can advantageously freely navigate between the Open Market TRANSACT ordering form of the purchase subsystem and a catalog user interface of the catalog subsystem.

Figure 10:
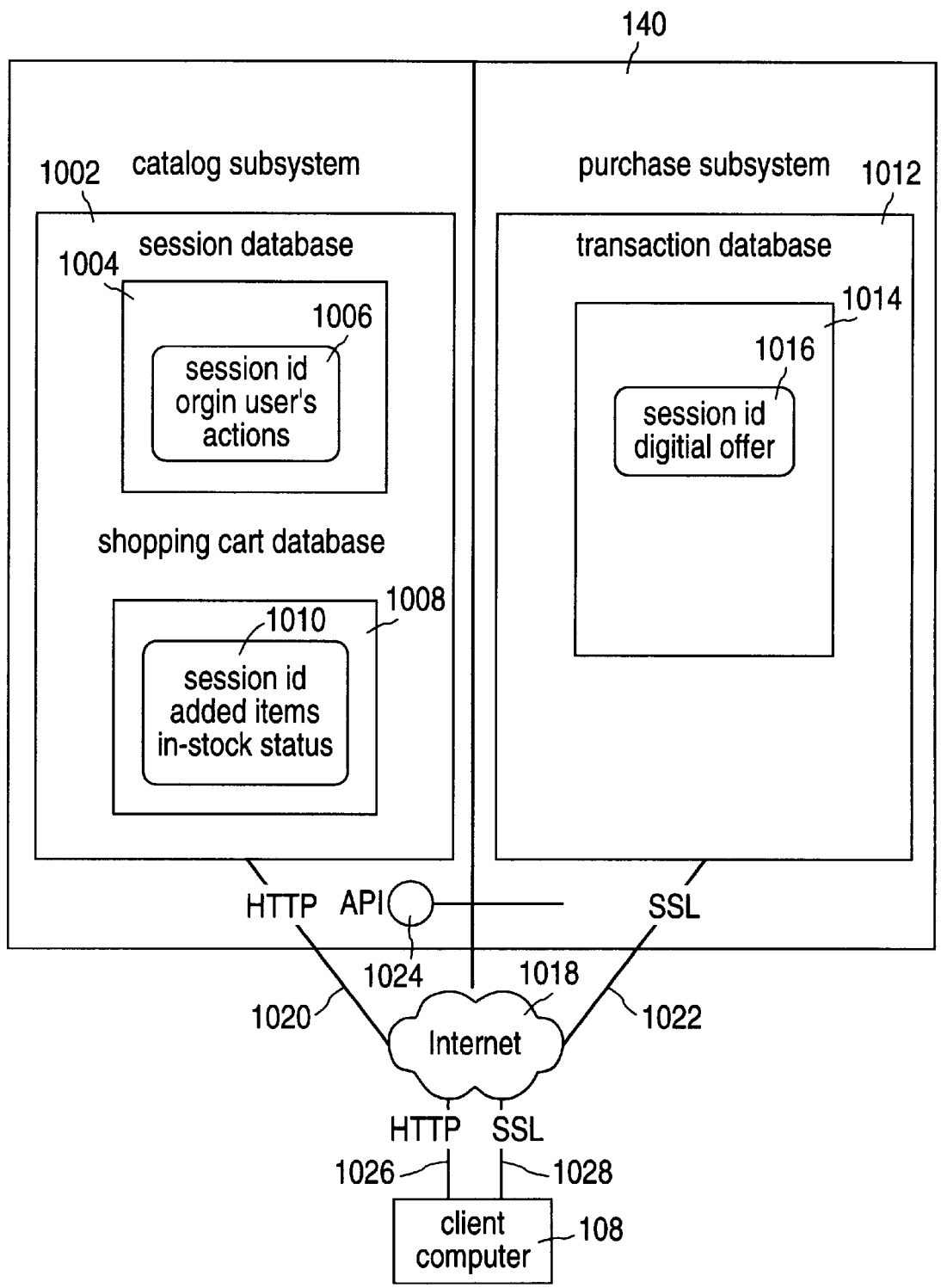
FIG. 10 is a block diagram of the architecture of a system for interactive network session tracking from inbound source to net sale in accordance with one embodiment of the present invention.

FIG. 10 is a block diagram of the architecture of a system for interactive network session tracking from inbound source to net sale in accordance with one embodiment of the present invention. In particular, FIG. 10 shows a catalog subsystem 1002 and a purchase subsystem 1012 stored in memory 140 (of FIG. 1). Catalog subsystem 1002 includes a front-end session database 1004 for tracking a user's actions on an interactive network site, such as a WWW online store site. For example, session database 1004 stores an entry 1006 that includes a unique session ID, an origin, and any user actions, as discussed above. Catalog subsystem 1002 also includes a front-end shopping cart database 1008 for maintaining the current contents of the user's shopping cart and associating the shopping cart with the session ID. For example, shopping cart database 1008 stores an entry 1010 that includes the session ID, added items, and in-stock status, as discussed above. Purchase subsystem 1012 includes a transaction database 1014 for storing digital offers and associating the digital offers with the session ID. For example, transaction database 1014 stores an entry 1016 that includes the session ID and a digital offer.

In one embodiment, the front-end shopping cart database is logically separated from the front-end session database as illustrated in FIG. 10. The front-end shopping cart database is implemented as a conventional database, such as a commercially available Oracle database. Similarly, the front-end session database can be implemented as a commercially available Oracle database. In another embodiment, the front-end session database and the front-end shopping cart database are implemented in the same logical database.

As shown in FIG. 10, catalog subsystem 1002 is in data communication with client computer 180 via the Internet 1018 using the standard HTTP protocol over a communication link 1020 and a communication link 1026. Purchase subsystem 1012 is in data communication with client computer 180 via the Internet 1018 using the standard SSL protocol over a communication link 1022 and a communication link 1028. Catalog subsystem 1002 is in data communication with purchase subsystem 1012 via an API 1024 using programmatic calls, as discussed above.

Although particular embodiments of the present invention have been shown and described, it will be obvious to those skilled in the art that changes and modifications can be made without departing from the present invention in its broader aspects. For example, a variety of programming languages can be used to implement the present invention, such as the well-known JAVA programming language, C++ programming language, C programming language, or any combination thereof. Also, a variety of databases can be used to implement the present invention, such as the commercially available Oracle database and the commercially available Open Market TRANSACT database. Also, the present invention can be used with a variety of multimedia communication environments, such as the well-known HTML or VRML environments, and a variety of protocols, such as the standard HTTP or SSL protocols. Therefore, the pending claims are to encompass within their scope all such changes and modifications that fall within the true scope of the present invention.

What is claimed is:

1. A process for interactive network session tracking from inbound source to net sale executed on a first computer, the process comprising:

storing an inbound source information of a user of a network site;

storing a net sale information of the net sale executed on the first computer by the user at the network site; and associating the inbound source information and the net sale information with a unique session identifier, including embedding the unique session identifier in a universal resource locator (URL) having a checksum that is used to execute the net sale.

2. The process of claim 1 further comprising:

storing the user activity of the user at the network site; and associating the user activity with the session identifier.

3. The process of claim 2 wherein the network site comprises a World Wide Web site.

4. The process of claim 2 wherein the inbound source information is stored in a session database of a catalog subsystem, the user activity is stored in the session database of the catalog subsystem, and the net sale information is stored in a transaction database of a purchase subsystem, and wherein the purchase subsystem is in data communication with a network via an encrypted protocol.

5. The process of claim 4 further comprising:

storing items selected by the user in a shopping cart database of the catalog subsystem.

6. The process of claim 5 further comprising:

updating the shopping cart database in real time to synchronize the shopping cart database with the transaction database.

7. The process of claim 4 wherein the catalog subsystem is in data communication with a second computer via an Internet using a HyperText Transfer Protocol, the purchase subsystem is in data communication with the second computer via the Internet using a Secure Sockets Layer protocol, and the catalog subsystem is in data communication with the purchase subsystem via an Application Program Interface using programmatic calls.

8. An article of manufacture for a computer-readable medium for interactive network session tracking from inbound source to net sale, the article of manufacture comprising:

a session database of a catalog subsystem configured to store an inbound source information of a user of a network site, the inbound source information being associated with a unique session identifier; and a transaction database of a purchase subsystem operatively connected to the session database, the transaction database being configured to store a net sale information of the net sale executed by the user, the net sale information being associated with the session identifier, the transaction database further being configured to process a universal resource locator (URL) having a checksum that includes the session identifier, wherein the purchase subsystem is in data communication with a network using an encrypted protocol.

9. The article of manufacture of claim 8 wherein the session database is configured to store user activity of the user at the network site, the user activity being associated with the session identifier.

10. The article of manufacture of claim 9 wherein the network site comprises a World Wide Web site.

11. The article manufacture of claim 8 further comprising:
   a shopping cart database of the catalog subsystem, the shopping cart database being configured to store an item selected for purchase by the user.

12. The article of manufacture of claim 11 wherein the shopping cart database is synchronized with the transaction database.

13. The article of manufacture of claim 8, further comprising:
   instructions for embedding the session identifier in the URL having the checksum stored in the transaction database.

14. The article of manufacture of claim 13 further comprising:
   instructions for extracting shopping cart data stored in the transaction database.

15. The article of manufacture of claim 8 further comprising:
   instructions for setting a HyperText Transfer Protocol transient cookie; and
   instructions for associating the transient cookie with the session identifier, whereby a World Wide Web browser session of the user is associated with the session identifier.

16. A machine for interactive network session tracking from inbound source to net sale, the machine comprising:
   a catalog subsystem of an interactive network site executed on a microprocessor, wherein the catalog subsystem comprises a session database that stores an inbound source of a user of the network site associated with a unique session identifier, the digital offer including a message authentication code; and
   a purchase subsystem of the network site executed on the microprocessor, wherein the purchase subsystem comprises a transaction database that stores a digital offer associated with the session identifier,
   wherein the purchase subsystem communicates with a network using an encrypted protocol.

17. The machine of claim 16 wherein the session database stores user activity of the user at the network site associated with the session identifier.

18. The machine of claim 16 wherein the catalog subsystem further comprises:
   a shopping cart database storing items selected by the user associated with the session identifier, wherein the shopping cart database is synchronized with the transaction database.

19. The machine of claim 18 wherein the network site comprises a World Wide Web online store site, and the network comprises an Internet.

20. The machine of claim 19 wherein the catalog subsystem interacts with a client computer via the Internet using a HyperText Transfer Protocol, and the purchase subsystem interacts with the client computer via the Internet using a Secure Sockets Layer protocol.

21. The process of claim 1 wherein the URL having the checksum includes a digital offer.

22. The process of claim 21 wherein the step of embedding the unique session identifier in the URL having the checksum includes embedding the unique session identifier in a unique ID field of the URL.

23. The article of manufacture of claim 13 wherein the URL having the checksum includes a digital offer.

24. The article of manufacture of claim 23 wherein the instructions for embedding the session identifier include an instruction for embedding the session identifier in a unique ID field of the URL having the checksum.

25. The machine of claim 16 wherein the digital offer includes the session identifier embedded in a unique ID field.

* * * * *